(12) United States Patent
Eyster et al.

(10) Patent No.: US 11,443,141 B2
(45) Date of Patent: Sep. 13, 2022

(54) USING VIDEO TRACKING TECHNOLOGY TO CREATE MACHINE LEARNING DATASETS FOR TASKS

(71) Applicant: International Business Machines Corporation, Armonk, NY (US)

(72) Inventors: Justin Eyster, Durham, NC (US); Al Chakra, Apex, NC (US); Aniruddh Jhavar, Cary, NC (US); Patrick Morrison, Raleigh, NC (US); Gagandeep Rajpal, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/802,893

(22) Filed: Feb. 27, 2020

(65) Prior Publication Data
US 2021/0271928 A1    Sep. 2, 2021

(51) Int. Cl.
| | | |
|---|---|---|
| G06K 9/62 | (2022.01) | |
| G06T 7/246 | (2017.01) | |
| G06N 20/00 | (2019.01) | |
| G06N 5/04 | (2006.01) | |
| G06V 40/20 | (2022.01) | |

(52) U.S. Cl.
CPC ............ *G06K 9/6257* (2013.01); *G06N 5/04* (2013.01); *G06N 20/00* (2019.01); *G06T 7/246* (2017.01); *G06V 40/20* (2022.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | |
|---|---|---|
| 6,169,573 B1 | 1/2001 | Sampath-Kumar et al. |
| 7,526,101 B2 | 4/2009 | Avidan |
| 8,639,644 B1 | 1/2014 | Hickman et al. |
| 2016/0059412 A1 | 3/2016 | Oleynik |
| 2019/0095716 A1 | 3/2019 | Shrestha et al. |

(Continued)

FOREIGN PATENT DOCUMENTS

| | | |
|---|---|---|
| CN | 102194105 B | 9/2011 |
| WO | 2018140969 A1 | 8/2018 |

OTHER PUBLICATIONS

Doo Young Kwon et al., Combining Body Sensors and Visual Sensors for Motion Training, 2005 https://graphics.ethz.ch/Downloads/Publications/Papers/2005/Kwo05/Kwo05.pdf.

(Continued)

*Primary Examiner* — Leon Viet Q Nguyen
(74) *Attorney, Agent, or Firm* — Terrile, Cannatti & Chambers, LLP; Emmanuel A. Rivera (57) ABSTRACT

A method, system and computer-usable medium are disclosed for tracking selected points in a series of images to determine motions made by a subject to perform an action to train a system, such as a machine or robot. A series of images are received depicting incremental steps of the subject performing the action. Selected points that are useful to track the subject performing the action are identified. Datasets of points used to train a model are mapped, and the model is trained using the mapped datasets of points.

20 Claims, 7 Drawing Sheets

(56) References Cited

U.S. PATENT DOCUMENTS

| | | | |
|---|---|---|---|
| 2019/0147220 A1 | 5/2019 | McCormac et al. | |
| 2019/0251340 A1* | 8/2019 | Brown | G06N 3/0445 |
| 2019/0385313 A1* | 12/2019 | Cavallo | G06N 3/006 |
| 2020/0193671 A1* | 6/2020 | Tamir | G06T 7/251 |
| 2020/0302634 A1* | 9/2020 | Pollefeys | G06T 7/70 |
| 2021/0122053 A1* | 4/2021 | Hallock | H04N 5/23206 |
| 2021/0178244 A1* | 6/2021 | Okur | A63B 71/0622 |
| 2021/0303833 A1* | 9/2021 | Huang | G16H 50/20 |

OTHER PUBLICATIONS

Hema Swetha Koppula et al., "Learning Human Activities and Object Affordances from RBB-D Videos," arXiv:12101207v2 (cs. RO) May 6, 2013, (Submitted on Oct. 4, 2012 (v1), last revised May 6, 2013 (this version, v2)), https://arxiv.org/abs/1210.1207.

Arunkumar Byravan et al., SE3-Nets: Learning Rigid Body Motion using Deep Neural Networks, 2016 https://homes.cs.washington.edu/~barun/files/icra17_se3nets.pdf.

David Held et al., Learning to Track at 100 FPS with Deep Regression Networks, (Submitted on Apr. 6, 2016 (v1), last revised Aug. 16, 2016 (this version, v2)), https://arxiv.org/pdf/1604.01802.pdf.

Cigde Eroglu Erdem et al., Video Object Tracking With Feedback of Performance Measures, IEEE Transactions on Circuits and Systems for Video Technology, vol. 13, No. 4, Apr. 2003, http://mimoza.marmara.edu.tr/~cigdem.erdem/papers/journal_papers/erdem_IEEECSVT_03_Tracking.pdf.

Christopher Rasmussen et al., Probabilistic Data Association Methods for Tracking Complex Visual Objects, IEEE Transactions on Pattern Analysis and Machine Intelligence, vol. 23, Issue: 6, Jun. 2001, http://www.cs.jhu.edu/~hager/Public/Publications/PDAFRasmussPAMI00.pdf.

* cited by examiner

USING VIDEO TRACKING TECHNOLOGY TO CREATE MACHINE LEARNING DATASETS FOR TASKS

BACKGROUND OF THE INVENTION

Field of the Invention

The present invention relates in general to the field of computers and similar technologies, and in particular to software utilized in this field. Still more particularly, it relates to a method, system and computer-usable medium for machine learning of tasks using video tracking.

Description of the Related Art

To accomplish tasks, robots and machines are often designed to mimic the behavior of humans, animals, or other objects.

For example, robots and machines can be trained to perform industrial operations typically undertaken by humans. In certain cases, such industrial operations can be repetitive and tedious. In certain instances, such operations can place people in danger, such as extracting or neutralizing dangerous objects or chemicals. There can also be medical applications where robots and machines can mimic or replicate the behavior and actions of medical professionals, such as operating on patients. The use of machines and robots to perform tasks and behaviors typically undertaken by humans is endless.

Although there can be numerous uses for robots and machines, teaching a robot or machine to perform tasks and behavior undertaken by humans can be an arduous and involved process. For example, personnel may have to manually and carefully study the behaviors and actions of humans, correlate such behaviors and actions for robots and machines, and program instructions for robots and machines.

SUMMARY OF THE INVENTION

A method, system and computer-usable medium are disclosed for tracking selected points in a series of images to determine motions made by a subject to perform an action to train a system, such as a machine or robot. A series of images are received depicting incremental steps of the subject performing the action. Selected points that are useful to track the subject performing the action are identified. Datasets of points used to train a model are mapped, and the model is trained using the mapped datasets of points.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Described herein a system, method, and computer-readable medium for machine learning of human related tasks and behaviors using video tracking. For purposes of this disclosure, an information processing handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
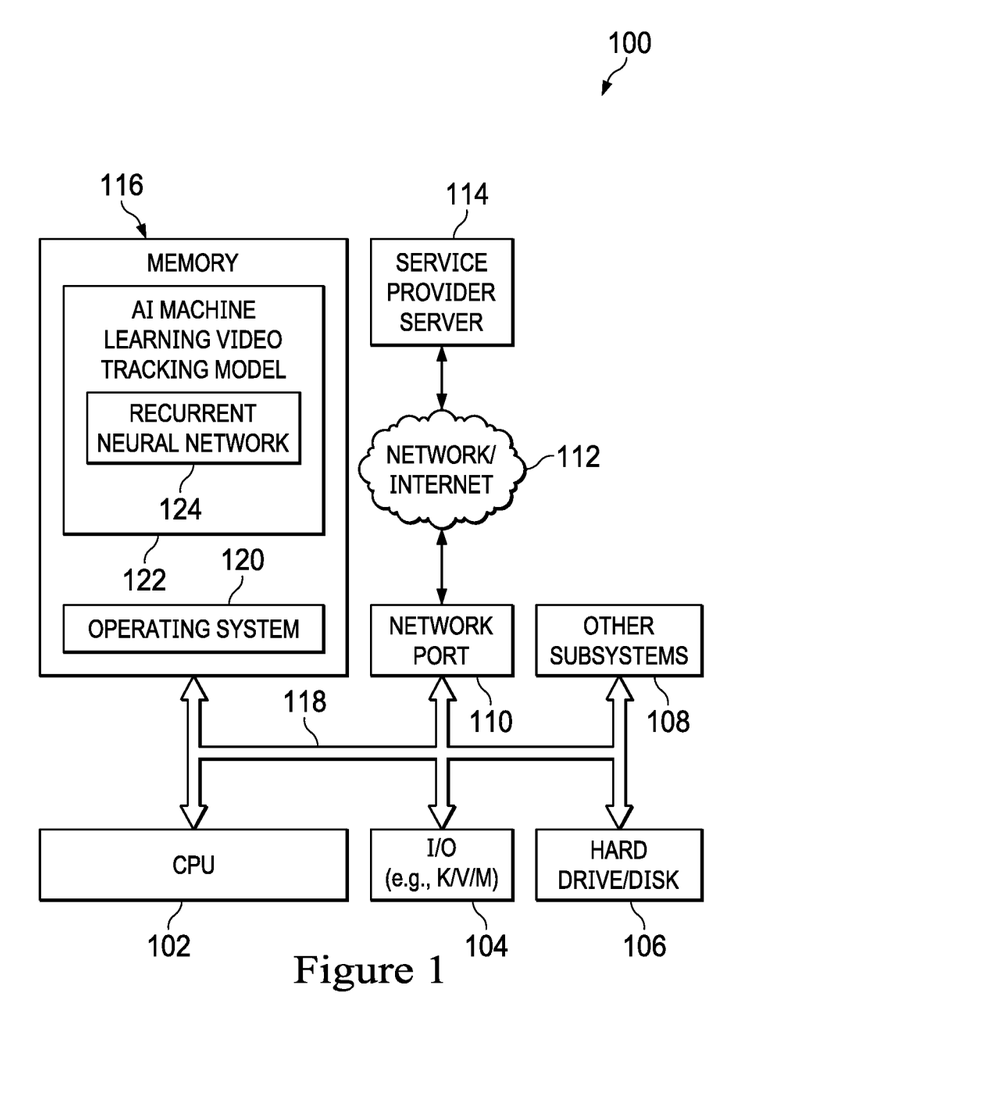
FIG. 1 depicts a simplified block diagram of an information handling system capable of performing computing operations.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 112, which is likewise accessible by a service provider (business/company) server 114. The network 112 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 116, which is interconnected to the foregoing via one or more buses 118. System memory 116 further includes an operating system (OS) 120 and in various embodiments includes an artificial intelligence (AI) machine learning video tracking model 122. In certain implementations, the AI machine learning video tracking model 122 includes a recurrent neural network (RNN) 124. In certain embodiments, the AI machine learning video tracking model 122 is created by analyzing video or video tracking for machine understanding of human behaviors and tasks. In certain implementations, the RNN 124 is trained with point-in-time, labeled matrices of video images as training data. The RNN 124 is provided with datasets of the point-in-time, labeled matrices of video images, and reinforcement learning is implemented to refine the behaviors and tasks as performed by a machine or robot.

Figure 2:
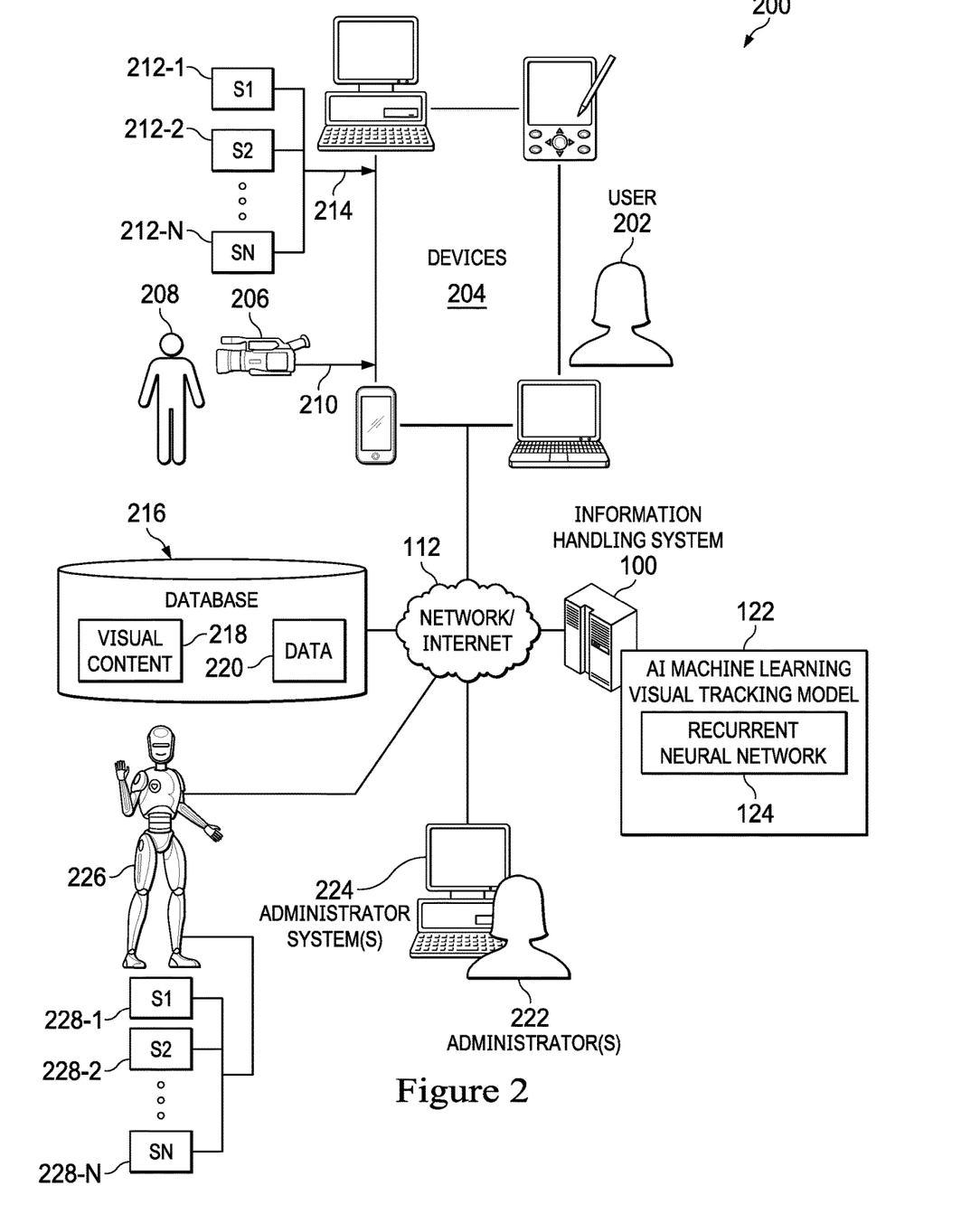
FIG. 2 depicts a network environment for machine learning of tasks using video tracking.

FIG. 2 is a network environment that for machine learning of tasks using video tracking. Environment 200 includes the information handling system 100, as described above in FIG. 1. As described above, the information handling system 100 includes the AI machine learning video tracking model 122 which includes a recurrent neural network (RNN) 124. The information handling system 100 is connected to the network 112. A user or users 202 through device(s) 204 connects to the network 112. Device(s) 204 refer to an information handling system such as a personal computer, a laptop computer, a tablet computer, a personal digital assistant (PDA), a smart phone, a mobile telephone, or other device that is capable of communicating and processing data.

A video camera or video image capture device 206 is connected to or part of device(s) 204. Video camera 206 is configured to capture video images of objects, such as a person/human or people/humans represented by human 208. Other objects (not shown) surrounding human 208 can also be captured by video camera 206. In particular, the video images are of tasks and behaviors that may be performed by human 208. The video images are provided 210 to device(s) 204. The video images are point in time data from a video stream (i.e., video) which is used to train the AI machine learning video tracking model 122. In certain implementations, point in time data from a video may be insufficient. Certain applications may need information about pressure, torque, weight, heat, light, moisture, sound, etc. While these metrics may be difficult to capture from video, physical sensors S1 212-1, S2 212-2 to SN 212-N can be implemented during live reinforcement learning, as further described below, to provide additional information for the AI machine learning video tracking model 122, allowing for an ability to respond in real time to physical feedback. In certain implementations, such data can be provided 214 to device(s) 204 and sent to information handling system 100 and the AI machine learning video tracking model 122.

In certain implementations, video data from device(s) from device(s) 204 is stored in a database 216, which can be in the form of video content 218. Other data 220 can also be stored in database 216, where other data can be physical data as described above. Video content 218 and data 220 can be provided to the information handling system 100 and the AI machine learning video tracking model 122.

Certain implementations provide for administrator(s) 222 to access and use the information handling system 100 and the AI machine learning video tracking model 122. In particular administrator(s) 222 through administrator system(s) 212 access and use AI machine learning video tracking model 122. In certain embodiments, a machine or robot 226 is trained by the AI machine learning video tracking model 122 to perform the tasks or behaviors as determined from human 208. The robot 226 trained by the AI machine learning video tracking model 122, attempts to imitate successful actions (behavior or tasks) and actions performed, and reinforcement learning is performed to refine actions of robot 226. In certain implementations, robot 226 can include physical sensors S1 228-1, S2 228-2 to SN 228-N. For example, in certain implementations, physical sensors S1 228-1, S2 228-2 to SN 228-N may be used for live reinforcement learning.

Figure 3A:
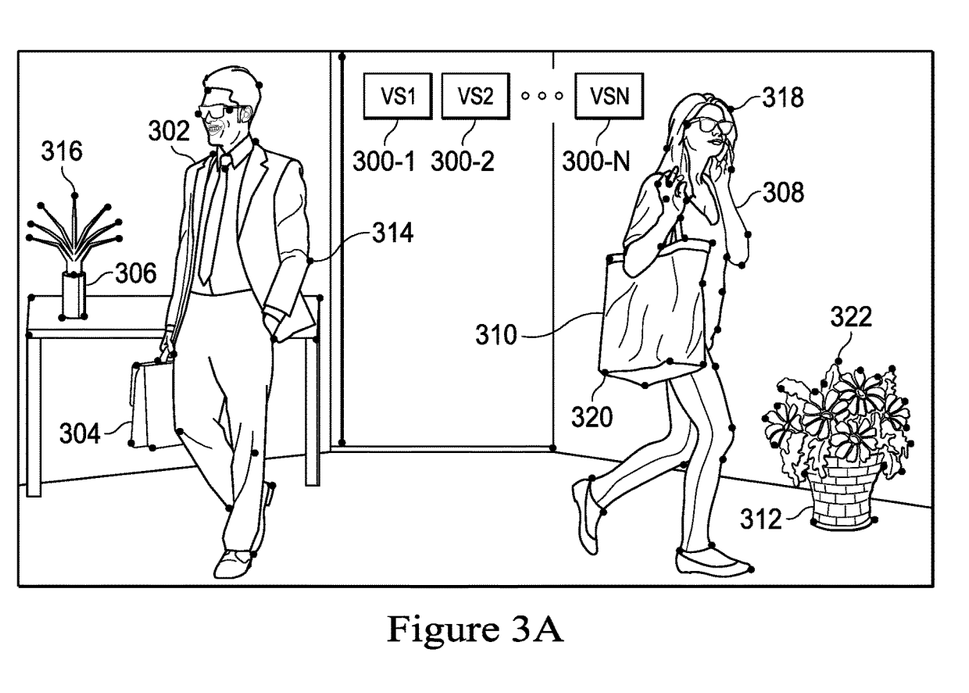
FIG. 3A depicts a video image of people and objects.

FIG. 3A shows a video image of various people and objects. Such an image is an example of a video image that can be obtained from by device(s) 204 as described above. In certain implementations, virtual sensors VS1 300-1, VS2 300-1 to VSN 300-N are implemented. The user of virtual sensors VS1 300-1, VS2 300-1 to VSN 300-N to track objects (e.g., humans) avoids the use of implementing physical sensors, such as motion sensors, which can be costly and in certain instances difficult or impossible to implement (e.g., microscopic organisms, objects in space, animals in the ocean, etc.)

In this example, the video image includes a person 302, an object 304, an object 306, another person 308, an object 310, and another object 312. Video tracking is performed on people (humans), animals, objects, etc. using the virtual sensors VS1 300-1, VS2 300-1 to VSN 300-N to track positions on points of a subject in a sequence of video images (i.e., video). In this example, person 302, person 308, and objects 304, 306, 310 and 312 are tracked. In particular, points of person 302, person 308, and objects 304, 306, 310 and 312 are tracked. Examples of points are point 314 to person 302, point 316 to object 306, point 318 to person 308, point 320 of object 310, point 322 to object 312. For certain implementations, key points or groups of key points are tracked over a series of video images. In certain implementations, the virtual sensors VS1 300-1, VS2 300-1 to VSN 300-N track positions of points on the subject in a video (or any objects that the subject interacts with), reporting relative Cartesian coordinate or x, y, z positions of virtual sensors VS1 300-1, VS2 300-1 to VSN 300-N. Therefore, for example, actions (i.e., behavior or task) of person 302 can be tracked relative to person 308 and objects 304, 306, 310 and 312.

For certain implementations, positions (i.e., x, y, z position) of key points are tracked over time and can be adjusted based on a sampling frequency (i.e., sampling a number of video images). Positions of the virtual sensors VS1 300-1, VS2 300-1 to VSN 300-N can be processed over time using matrices processed by AI machine learning video tracking model 122. This can be performed for each step in a human related behavior or task. As further described below the step in the behavior or task may be successful or non-successful and can be identified as a "1" (successful) or "0" (non-successful). In certain implementations, after the AI machine learning video tracking model 122 is trained, live reinforcement training is performed with the robot 226 using physical sensors, such as physical sensors S1 228-1, S2 228-2 to SN 228-N.

Figure 3B:
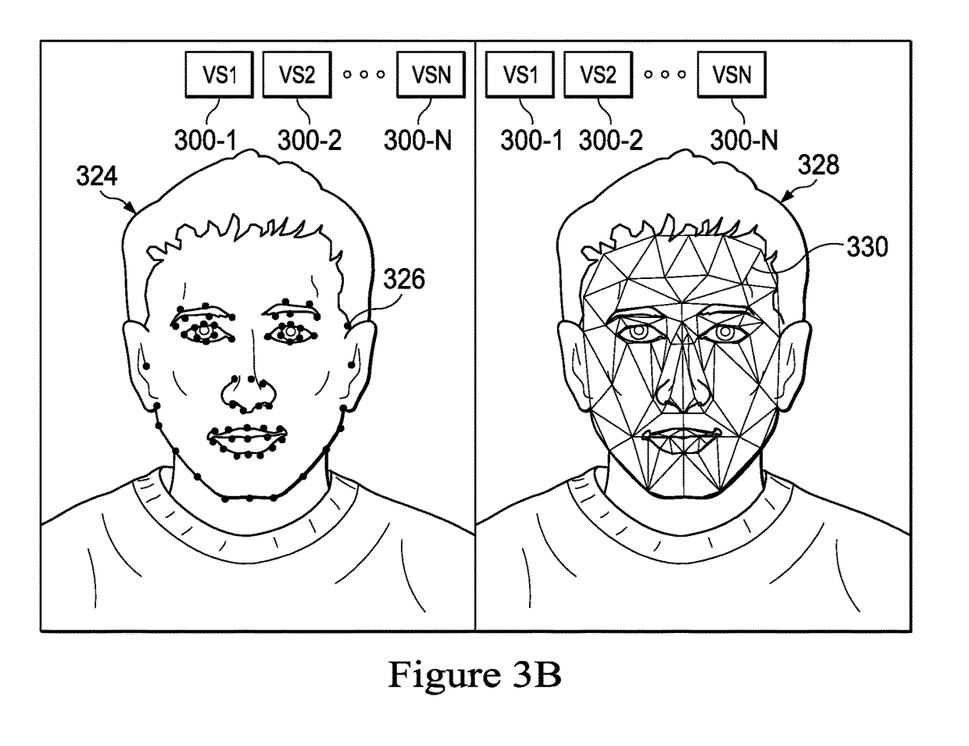
FIG. 3B depicts a video image of a human face.

FIG. 3B shows a video image of a human face. Human face 324 can be identified by different points, such as points 326. As described virtual sensors VS1 300-1, VS2 300-1 to VSN 300-N can be used to track positions of the points. In certain implementations, human face 328 is tracked using spatial areas, for example spatial area 330. Virtual sensors VS1 300-1, VS2 300-1 to VSN 300-N can be used to track positions of the spatial areas, such as spatial area 330.

Figure 3C:
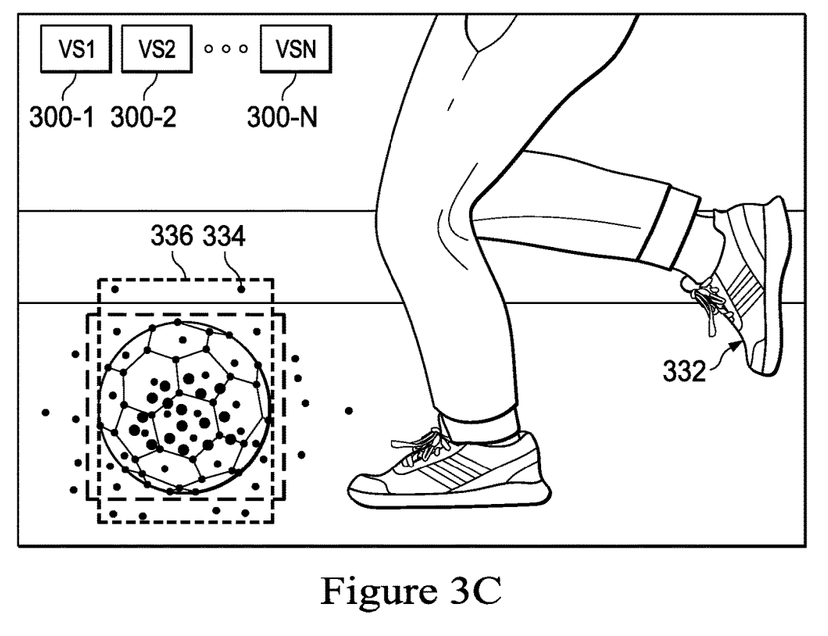
FIG. 3C depicts an image of a step in a human task or behavior.

FIG. 3C shows an image of a step in a human task or behavior. In the video image of FIG. 3C, a step of kicking a soccer ball is tracked. Position of a foot 332 is tracked in relation to a soccer ball as represented by group of points which include for example point 334 and other points. As further discussed below, other body parts, such as an ankle and/or knee can also be tracked relative to the other objects (e.g., soccer ball). In certain implementations, video tracking is performed on spatial areas of the video image, for example spatial area 336 which represents the soccer ball.

Figure 4A:
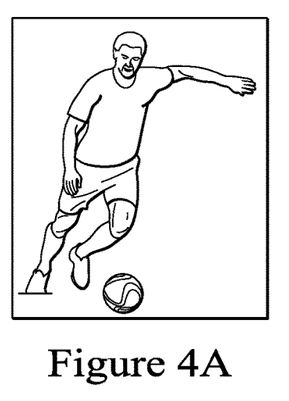
FIG. 4A is a video image of a step in a series of steps in a human task.
Figure 4B:
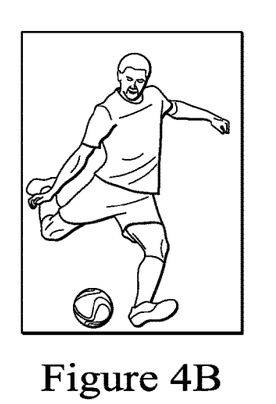
FIG. 4B is a video image of a step in a series of steps in a human task.
Figure 4C:
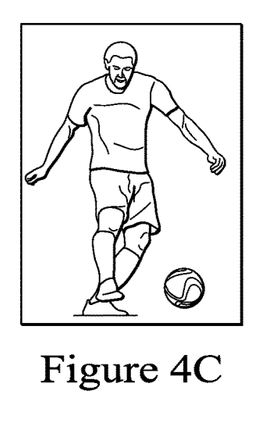
FIG. 4C is a video image of a step in a series of steps in a human task.
Figure 4D:
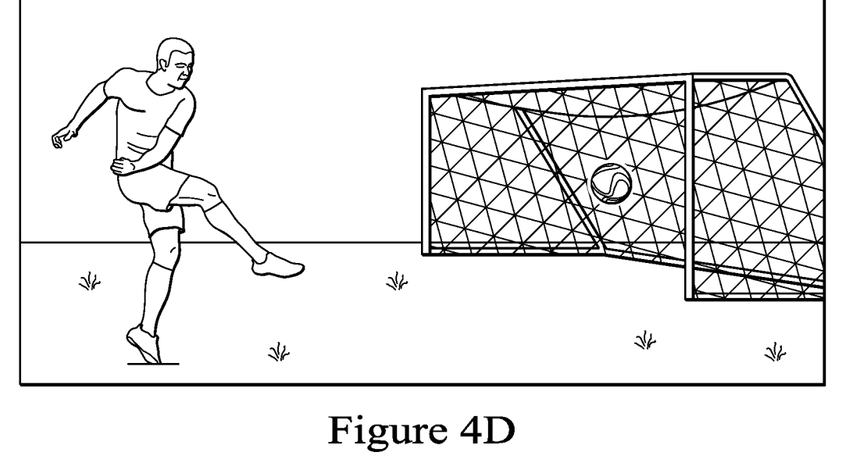
FIG. 4D is a video image of a successful step in a series of steps in a human task.
Figure 4E:
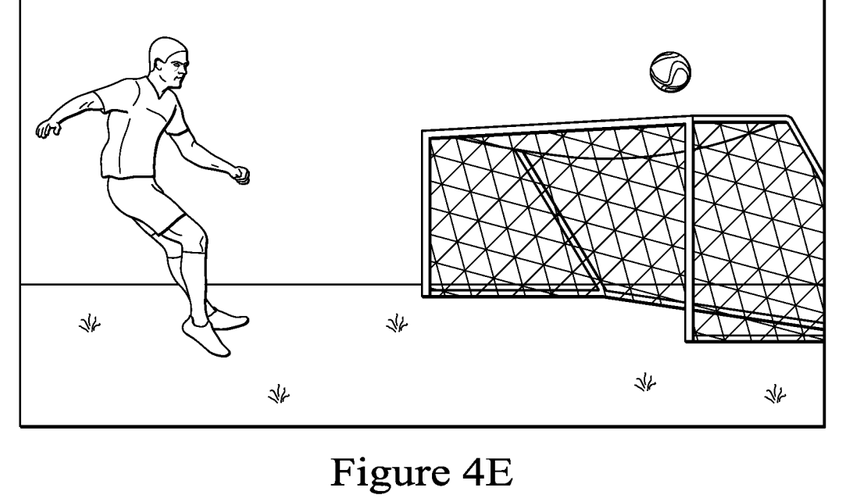
FIG. 4E is a video image of a non-successful step in a series of steps in a human task.

FIGS. 4A, 4B, 4C, 4D and 4E are video images representing a series of steps in a human action (i.e., behavior or task). In particular, in this example, the series of steps is directed to kicking a soccer ball into a goal. As described above, points of a human and object are tracked. In this example, the human is a soccer player whose actions are tracked in relation to a soccer ball and a goal. Such video images and tracking is provided as data to the AI machine learning video tracking model 122 to train a machine or robot, such as robot 226 to perform the task of kicking a soccer ball into a goal. In this example, FIGS. 4A, 4B, 4C are video images representing steps that lead to either a successful step as represented by the video image of FIG. 4D or a non-successful step as represented by the video image of FIG. 4E. As discussed, a successful step can be identified as a "1". FIG. 4D can be classified or identified as "1" to the AI machine learning video tracking model 122. A non-successful step can be identified as a "0". FIG. 4E can be classified or identified as "0" to the AI machine learning video tracking model 122.

Figure 5:
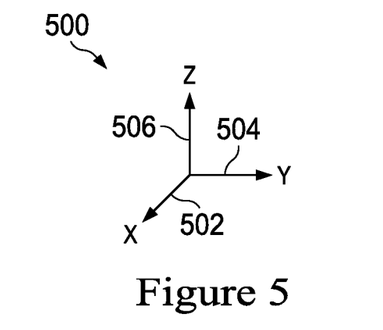
FIG. 5 is an x, y, z axis for position of points in a video image.

FIG. 5 shows x, y, z axis for position of points in a video image. As discussed, points of a human and/or an object are tracked by virtual sensors, such as virtual sensors VS1 300-1, VS2 300-1 to VSN 300-N. In certain implementations, relative position is determined by Cartesian coordinate plane 500 represented x axis 502, y axis 504 and z axis 506. As discussed, for certain implementations, coordinate position is tracked over time and can be adjusted based on sampling frequency. Coordinate positions of points as determined by virtual sensors VS1 300-1, VS2 300-1 to VSN 300-N can be processed over time using matrices that can be processed by AI machine learning video tracking model 122. This can be performed for each step as identified in video image in a human related task or behavior.

For example, using the example of kicking a soccer ball into a goal. Tracking can be performed as to a soccer player's movement of a foot, ankle and knee, as well as tracking of a soccer ball and the position of the goal. For example, a sampling frequency can be one sample for every millisecond. Virtual sensors track the foot, ankle, knee, ball the four corners of the goal. Example columns of data in a matrix can be represented as follows:

time(ms) foot (x,y,z) ankle(x,y,z) knee(x,y,z) ball(x,y,z) q1(x,y,z) q2(x,y,z) q3(x,y,z) q4(x,y,z)

As an example, for training data, a matrix dimension be columns of data multiplied by the number of samples for sampling frequency (e.g., one sample for each millisecond). Labels can be "1" for successful step and "0" for non-successful step. Positional data is processed into matrices that are used by AI machine learning video tracking model 122, where each consecutive row represents a consecutive point in time when a measurement was taken, and the columns are the x, y, and z positions for each virtual sensor at that point-in-time. A step in the behavior or task that is being learned is represented by a matrix of all the positional measurements during the step, and can be assigned a label of "1" if the step was successful and "0" if it is not, for the purpose of training feedback.

The AI machine learning video tracking model 122 is then trained to predict successful kicks. In an implementation, a robot, such as robot 226 attempts to make successful goal kicks in live reinforcement training.

Figure 6:
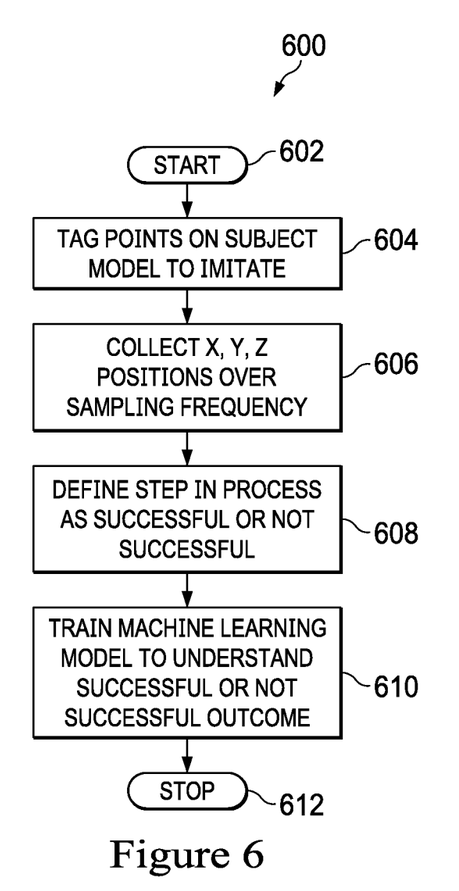
FIG. 6 is a generalized flowchart of the operation for initial training of an AI machine learning video tracking model.

FIG. 6 is a generalized flowchart 600 for initial training of an AI machine learning video tracking model. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, the process 600 starts. At step 604, points of interest on a subject in video are tagged. The subject having a behavior or performing a task the model is attempting to imitate. In addition to the subject, other objects or persons that interact with the subject are also tagged. The use of virtual sensors for tagging can be implemented.

At step 606, coordinate or x, y, z positions as determined by the virtual sensors is collected. The collection is performed over a sampling frequency. For example, if there are two virtual samples, once per second, the collected data can look like the following:

| seconds | x1 | y1 | z1 | x2 | y2 | z2 |
|---|---|---|---|---|---|---|
| 1 | 2.351 | 10.827 | −0.042 | 8.451 | −4.783 | −11.911 |
| 2 | 4.861 | 1.111 | −7.683 | −2.451 | 5.544 | −4.589 |

At step 608, a step in the process is defined as a subset of sampling data (e.g., in matrix), and an association is made if the step is successful (i.e., "1") or non-successful (i.e., "0").

At step 610, the AI machine learning video tracking model is trained to understand successful or non-successful outcomes, by understanding the mapping between a matrix of positions that include a step and successful and non-successful outcomes. At block 612, the process 600 ends.

Figure 7:
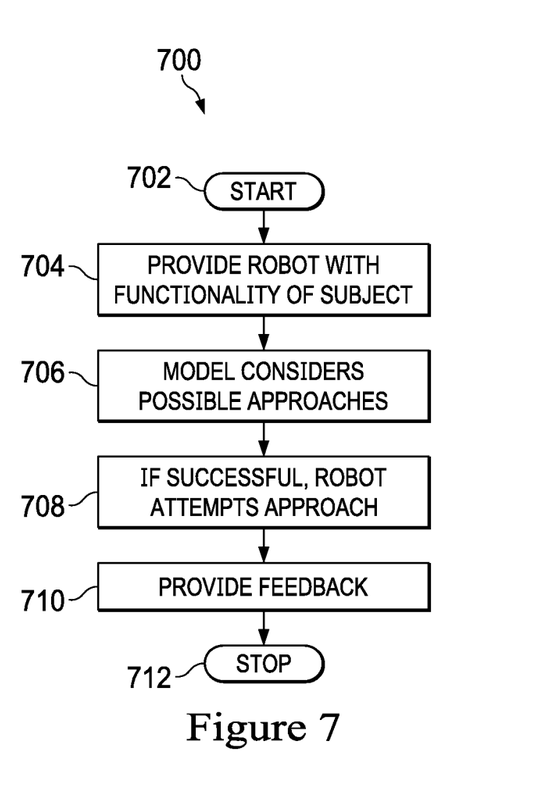
FIG. 7 is a generalized flowchart of the operation of refining an AI machine learning video tracking model by live reinforcement learning.

FIG. 7 is a generalized flowchart 700 for refining an AI machine learning video tracking model by live reinforcement learning. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, the process 700 starts. At step 704, a robot or machine is provided that can support the functionality of a subject such as a human. In other words, the robot or machine is capability to perform steps of a tasks or behavior performed by the subject. In certain implementations, sensors can be provided to the robot or machine that support pressure, torque, weight, heat, etc. Such sensors can be related to environmental factors that are not captured by video tracking data but may be necessary in replicating a task or behavior.

At step 706, the AI machine learning video tracking model considers possible approaches to a step, such as positions of points of interest over time, as well as additional sensor feedback.

At step 708, when the AI machine learning video tracking model determines a successful approach, the robot or machine attempts the approach (i.e., task or behavior).

At step 710, feedback is provided back to the AI machine learning video tracking model if the approach (i.e., steps performed in the approach) is successful or not successful. Such feedback can be a binary feedback (i.e., "1" successful, "0" non-successful) provided by the AI machine learning video tracking model or a person, such as an administrator (e.g., administrator 222). If successful, the AI machine learning video tracking model can use such data to refine the approach (task or behavior). In certain implementations, if AI machine learning video tracking model provides feedback about the success of a step, during implementation, if the step is successful, go to next step, if not successful try step again. At block 712, the process 700 ends.

Figure 8:
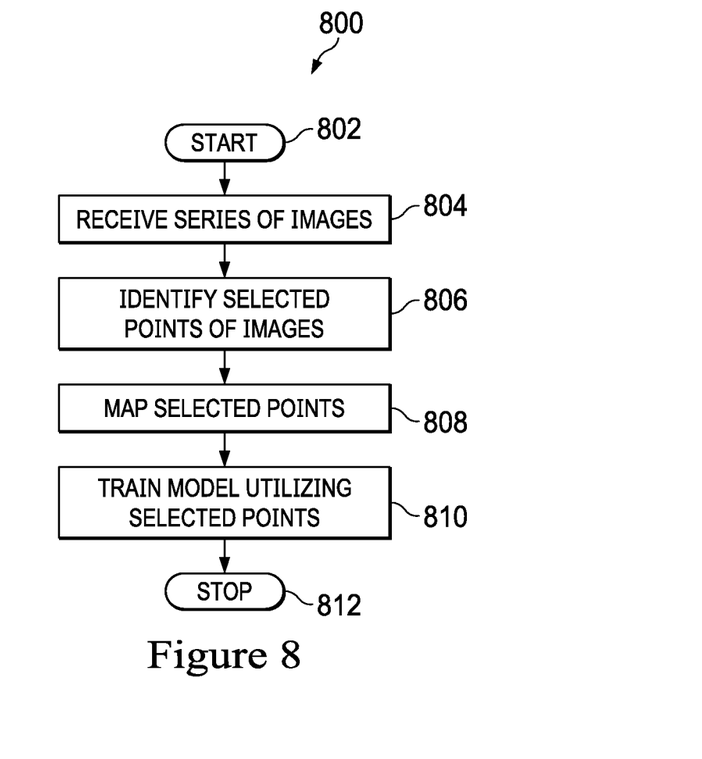
FIG. 8 is a generalized flowchart of the operation of tracking selected points in a series of images to determine motions made by a subject to perform an action to train a system to perform the action.

FIG. 8 is a generalized flowchart 800 for tracking selected points in a series of images to determine motions made by a subject to perform an action to train a system to perform the action. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 802, the process 800 starts. At step 804, a series of video images are received, where successive images depict incremental steps of the subject performing the action which can be a task or behavior. At step 806, selected points are identified which are useful for tracking the subject performing the action. At step 808, selected points are mapped useful for training a AI machine learning video tracking model. At step 810, the AI machine learning video tracking model is trained using the mapped selected points. At block 812, the process 800 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for tracking selected points in a series of video images of captured video to determine motions made by a subject to perform an action to train a system to perform the action comprising:
   receiving the series of video images of the captured video, wherein successive video images depict incremental steps of the subject performing the action;
   identifying selected key points associated with the subject useful for tracking the subject performing the action, wherein the key points associated with the subject are tracked over time and adjusted based on a sampling frequency of the captured video;
   mapping datasets of points to be used to train a model;
   using physical sensors for live reinforcement learning; and
   training the model utilizing the mapped datasets of points and live reinforcement training.

2. The computer implemented method of claim 1, wherein the datasets of points comprise a first dataset of points as to the subject and a second data set of points of an object related to action.

3. The computer implemented method of claim 1 further comprising receiving relative position of points in the series of video images using virtual sensors.

4. The computer implemented method of claim 3, wherein the virtual sensors provide the datasets of points used to train the model.

5. The computer implemented method of claim 1, wherein the series of video images are from video and the system that performs the action is a machine or robot.

6. The computer implemented method of claim 1 further comprising performing a live reinforcement training of the system to refine the action.

7. The computer implemented method of claim 1 further comprising implementing physical sensors to capture data not available in the video images and related to performing the action.

8. A system comprising:
   a processor;
   a data bus coupled to the processor; and
   a computer-usable medium embodying computer program code, the computer-usable medium being coupled to the data bus, the computer program code used for tracking selected points in a series of video images of capture video to determine motions made by a subject to perform an action to train a system to perform the action comprising instructions executable by the processor and configured for:
      receiving the series of video images of the captured video, wherein successive video images depict incremental steps of the subject performing the action;
      identifying selected key points associated with the subject useful for tracking the subject performing the action, wherein the key points associated with the subject are tracked over time and adjusted based on a sampling frequency of the captured video;
      mapping datasets of points to be used to train a model;
      using physical sensors for live reinforcement learning; and
      training the model utilizing the mapped datasets of points and live reinforcement training.

9. The system of claim 8, wherein the datasets of points comprise a first dataset of points as to the subject and a second data set of points of an object related to action.

10. The system of claim 8 further comprising receiving relative position of points in the series of video images using virtual sensors.

11. The system of claim 10, wherein the virtual sensors provide the datasets of points used to train the model.

12. The system of claim 8, wherein the series of video images are from video and the system that performs the action is a machine or robot.

13. The system of claim 8 further comprising performing a live reinforcement training of the system to refine the action.

14. The system of claim 8 further comprising implementing physical sensors to capture data not available in the video images and related to performing the action.

15. A non-transitory, computer-readable storage medium embodying computer program code for tracking selected points in a series of video images of captured video to determine motions made by a subject to perform an action to train a system to perform the action, the computer program code comprising computer executable instructions configured for:

receiving the series of video images of the captured video, wherein successive video images depict incremental steps of the subject performing the action;

identifying selected key points associated with the subject useful for tracking the subject performing the action, wherein the key points associated with the subject are tracked over time and adjusted based on a sampling frequency of the captured video;

mapping datasets of points to be used to train a model;

using physical sensors for live reinforcement learning; and training the model utilizing the mapped datasets of points and live reinforcement training.

16. The non-transitory, computer-readable storage medium of claim 15, wherein the datasets of points comprise a first dataset of points as to the subject and a second data set of points of an object related to action.

17. The non-transitory, computer-readable storage medium of claim 15 further comprising receiving relative position of points in the series of video images using virtual sensors.

18. The non-transitory, computer-readable storage medium of 17, wherein the virtual sensors provide the datasets of points used to train the model.

19. The non-transitory, computer-readable storage medium of 15, wherein the series of video images are from video and the system that performs the action is a machine or robot.

20. The non-transitory, computer-readable storage medium of 15 further comprising performing a live reinforcement training of the system to refine the action.

* * * * *